(12) United States Patent
Macpherson

(10) Patent No.: US 9,007,231 B2
(45) Date of Patent: Apr. 14, 2015

(54) SYNCHRONIZATION OF DISTRIBUTED MEASUREMENTS IN A BOREHOLE

(71) Applicant: John D. Macpherson, Spring, TX (US)

(72) Inventor: John D. Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 193 days.

(21) Appl. No.: 13/743,720

(22) Filed: Jan. 17, 2013

(65) Prior Publication Data

US 2014/0197962 A1    Jul. 17, 2014

(51) Int. Cl.
*E21B 47/12* (2012.01)
*G01V 3/18* (2006.01)

(52) U.S. Cl.
CPC ....................................... *G01V 3/18* (2013.01)

(58) Field of Classification Search
USPC .......... 340/853.1, 853.7, 854.3, 854.4, 854.9, 340/855.1, 855.2, 855.4; 367/25, 27, 81, 367/82; 175/40, 45; 702/6; 713/400, 401
See application file for complete search history.

(56) References Cited

U.S. PATENT DOCUMENTS

| | | |
|---|---|---|
| 4,096,567 A | 6/1978 | Millard et al. |
| 4,110,728 A | 8/1978 | Fuller et al. |
| 4,309,763 A | 1/1982 | Passmore et al. |
| 4,509,170 A | 4/1985 | Hollinger et al. |
| 4,665,404 A | 5/1987 | Christy et al. |
| 4,748,617 A | 5/1988 | Drewlo |
| 4,797,677 A | 1/1989 | MacDoran et al. |
| 4,802,143 A | 1/1989 | Smith |
| 4,809,005 A | 2/1989 | Counselman, III |
| 4,894,662 A | 1/1990 | Counselman |
| 4,967,400 A | 10/1990 | Woods |
| 5,163,521 A | 11/1992 | Pustanyk et al. |
| 5,283,768 A | 2/1994 | Rorden |
| 5,293,937 A | 3/1994 | Schultz et al. |
| 5,313,648 A | 5/1994 | Ehlig et al. |
| 5,319,789 A | 6/1994 | Ehlig et al. |
| 5,392,299 A | 2/1995 | Rhines et al. |
| 5,416,808 A | 5/1995 | Witsaman et al. |
| 5,583,824 A | 12/1996 | Fletcher |
| 5,589,825 A | 12/1996 | Pomerleau |
| 5,592,438 A | 1/1997 | Rorden et al. |
| 5,654,988 A | 8/1997 | Heyward et al. |
| RE35,790 E | 5/1998 | Pustanyk et al. |
| 5,815,723 A | 9/1998 | Wilkinson et al. |

(Continued)

OTHER PUBLICATIONS

International Search Report and Written Opinion for PCT Application No. PCT/US2014/011824, dated Apr. 21, 2014, pp. 1-15.

(Continued)

*Primary Examiner* — Andrew Bee
(74) *Attorney, Agent, or Firm* — Cantor Colburn LLP

(57) ABSTRACT

A system and method to synchronize distributed measurements in a borehole are described. The system includes a plurality of wired segments coupled together by couplers and a plurality of nodes configured to measure, process, or relay information obtained in the borehole to a surface processing system, each of the plurality of nodes comprising a local clock and being disposed at one of the couplers or between couplers. The system also includes a surface processing system coupled to a master clock and configured to determine a time offset between the master clock and the local clock of an nth node among the plurality of nodes based on a downhole generated synchronization signal.

19 Claims, 2 Drawing Sheets

(56) References Cited

U.S. PATENT DOCUMENTS

| | | |
|---|---|---|
| 5,850,369 A | 12/1998 | Rorden et al. |
| 5,894,450 A | 4/1999 | Schmidt et al. |
| 5,924,499 A | 7/1999 | Birchak et al. |
| 5,995,040 A | 11/1999 | Issler et al. |
| 6,002,640 A | 12/1999 | Harmon |
| 6,018,501 A | 1/2000 | Smith et al. |
| 6,079,505 A | 6/2000 | Pignard et al. |
| 6,131,694 A | 10/2000 | Robbins et al. |
| 6,144,316 A | 11/2000 | Skinner |
| 6,177,882 B1 | 1/2001 | Ringgenberg et al. |
| 6,240,505 B1 | 5/2001 | Boutaud et al. |
| 6,243,657 B1 | 6/2001 | Tuck et al. |
| 6,243,801 B1 | 6/2001 | Boutaud et al. |
| 6,249,860 B1 | 6/2001 | Boutaud et al. |
| 6,263,418 B1 | 7/2001 | Boutaud et al. |
| 6,263,419 B1 | 7/2001 | Boutaud et al. |
| 6,269,198 B1 | 7/2001 | Hodgson et al. |
| 6,288,975 B1 | 9/2001 | Frederick et al. |
| 6,294,917 B1 | 9/2001 | Nichols |
| 6,310,829 B1 | 10/2001 | Green et al. |
| 6,311,264 B1 | 10/2001 | Boutaud et al. |
| 6,320,820 B1 | 11/2001 | Gardner et al. |
| 6,370,082 B1 | 4/2002 | Gardner et al. |
| 6,400,646 B1 | 6/2002 | Shah et al. |
| 6,424,595 B1 | 7/2002 | Chenin |
| 6,553,316 B2 | 4/2003 | Bary et al. |
| 6,614,718 B2 | 9/2003 | Cecconi et al. |
| 6,618,674 B2 | 9/2003 | Ireland et al. |
| 6,724,319 B1 | 4/2004 | Knaack et al. |
| 6,728,165 B1 | 4/2004 | Roscigno et al. |
| 6,912,465 B2 | 6/2005 | Collins et al. |
| 6,986,142 B1 | 1/2006 | Ehlig et al. |
| 6,990,045 B2 | 1/2006 | Jackson |
| 7,046,584 B2 | 5/2006 | Sorrells et al. |
| 7,068,183 B2 | 6/2006 | Shah et al. |
| 7,123,160 B2 | 10/2006 | Hall et al. |
| 7,135,933 B2 | 11/2006 | Bartholomew |
| 7,139,218 B2 | 11/2006 | Hall et al. |
| 7,142,129 B2 | 11/2006 | Hall et al. |
| 7,176,589 B2 | 2/2007 | Rouquette |
| 7,190,634 B2 | 3/2007 | Lambert et al. |
| 7,193,932 B2 | 3/2007 | Chamberlain |
| 7,205,939 B2 | 4/2007 | Zimmerman |
| 7,210,555 B2 | 5/2007 | Shah et al |
| 7,224,984 B2 | 5/2007 | Agrawala et al. |
| 7,230,543 B2 | 6/2007 | Minto et al. |
| 7,269,095 B2 | 9/2007 | Chamberlain et al. |
| 7,271,766 B2 | 9/2007 | Zimmerman et al. |
| 7,315,278 B1 | 1/2008 | Bauregger et al. |
| 7,339,524 B2 | 3/2008 | Zimmerman et al. |
| 7,339,525 B2 | 3/2008 | Zimmerman et al. |
| 7,339,526 B2 | 3/2008 | Zimmerman |
| 7,342,538 B2 | 3/2008 | Zimmerman |
| 7,345,627 B2 | 3/2008 | Zimmerman et al. |
| 7,382,318 B2 | 6/2008 | Zimmerman et al. |
| 7,385,554 B2 | 6/2008 | Zimmerman et al. |
| 7,453,768 B2 | 11/2008 | Hall et al. |
| 7,496,059 B2 | 2/2009 | Yoon |
| 7,522,639 B1 | 4/2009 | Katz |
| 7,532,160 B1 | 5/2009 | Zimmerman et al. |
| 7,551,516 B2 | 6/2009 | Harmon |
| 7,561,493 B2 | 7/2009 | Ray et al. |
| 7,583,560 B2 | 9/2009 | Chamberlain et al. |
| 7,646,670 B2 | 1/2010 | Maxwell et al. |
| 7,668,041 B2 | 2/2010 | Fanini et al. |
| 7,668,047 B2 | 2/2010 | Ray et al. |
| 7,686,099 B2 | 3/2010 | Rodney |
| 7,688,747 B2 | 3/2010 | Zumsteg |
| 7,710,822 B2 | 5/2010 | Harmon |
| 7,711,480 B2 | 5/2010 | Robbins |
| 7,730,967 B2 | 6/2010 | Ballantyne et al. |
| 7,769,544 B2 | 8/2010 | Blesener et al. |
| 7,898,904 B2 | 3/2011 | Arnegaard et al. |
| 7,969,819 B2 | 6/2011 | Hall et al. |
| 7,986,589 B2 | 7/2011 | Ray et al. |
| 8,009,510 B2 | 8/2011 | Chang |
| 8,069,932 B2 | 12/2011 | Kamata |
| 8,121,789 B2 | 2/2012 | Dickens et al. |
| 8,151,905 B2 | 4/2012 | Song |
| 8,164,980 B2 | 4/2012 | Sullivan et al. |
| 8,181,057 B2 | 5/2012 | Nichols et al. |
| 8,228,757 B2 | 7/2012 | Beffa et al. |
| 8,243,550 B2 | 8/2012 | Jeffryes |
| 8,312,320 B2 | 11/2012 | Almadi et al. |
| 2009/0038392 A1 | 2/2009 | Alfred et al. |
| 2009/0187345 A1 | 7/2009 | Blanz |
| 2010/0313646 A1 | 12/2010 | Mehta et al. |

OTHER PUBLICATIONS

National Instruments, "Introduction to Distributed Clock Synchronization and the IEEE 1588 Precision Time Protocol", May 21, 2012, pp. 1-4.

SYNCHRONIZATION OF DISTRIBUTED MEASUREMENTS IN A BOREHOLE

BACKGROUND

During downhole exploration and formation excavation, a number of sensors and measurement devices may be used to characterize the downhole environment. Each measurement, or record of measurements, may be time-stamped, or associated with a known time, so that the measurements from the various devices may be processed together at the surface. However, each of the downhole measurement platforms operates with a respective local clock that is typically not synchronized with the surface master clock. Thus, before the various distributed measurements may be processed together, they must be synchronized to a common time. In prior systems, the surface processing system has undertaken the synchronization. For example, the master clock at the surface generates a synchronization signal, and the local clocks downhole use the signal to set their time in agreement with the master clock's time so that all time stamps are referenced to the same (master clock) time. As another example, the master clock generates a synchronization signal, and based on a response to that signal from each downhole device, the surface processing system stores a measured offset from the master clock for each device.

SUMMARY

According to one aspect of the invention, a system to synchronize distributed measurements in a borehole includes a plurality of wired segments coupled together by couplers; a plurality of nodes configured to measure, process, or relay information obtained in the borehole to a surface processing system, each of the plurality of nodes comprising a local clock and being disposed at one of the couplers or between couplers; and a surface processing system coupled to a master clock and configured to determine a time offset between the master clock and the local clock of an nth node among the plurality of nodes based on a downhole generated synchronization signal.

According to another aspect of the invention, a method of synchronizing distributed measurements in a borehole includes disposing a known number of wired segments coupled together by couplers in the borehole; disposing nodes along the wired segments, the nodes being disposed at two or more of the couplers or between couplers and each node comprising a local clock and configured to measure or relay information obtained in the borehole to a surface processing system; generating a time-stamped signal at an nth node based on the local clock of the nth node; receiving the time-stamped signal at the surface processing system; and the surface processing system computing a time offset between a master clock associated with the surface processing system and the local clock of the nth node.

BRIEF DESCRIPTION OF THE DRAWINGS

Referring now to the drawings wherein like elements are numbered alike in the several Figures.

DETAILED DESCRIPTION

As noted above, prior systems have synchronized local clocks of downhole devices with a master clock at the surface by using a synchronization signal generated by the master clock or some other form of synchronization initiated by the master clock. Embodiments of the invention described herein use the fact that the time at a local clock need not be synchronized and reset as long as its offset from the master clock is determined and accounted for. Accordingly, embodiments described herein include downhole initiation of a synchronization process rather than synchronization by the master clock.

Figure 1:
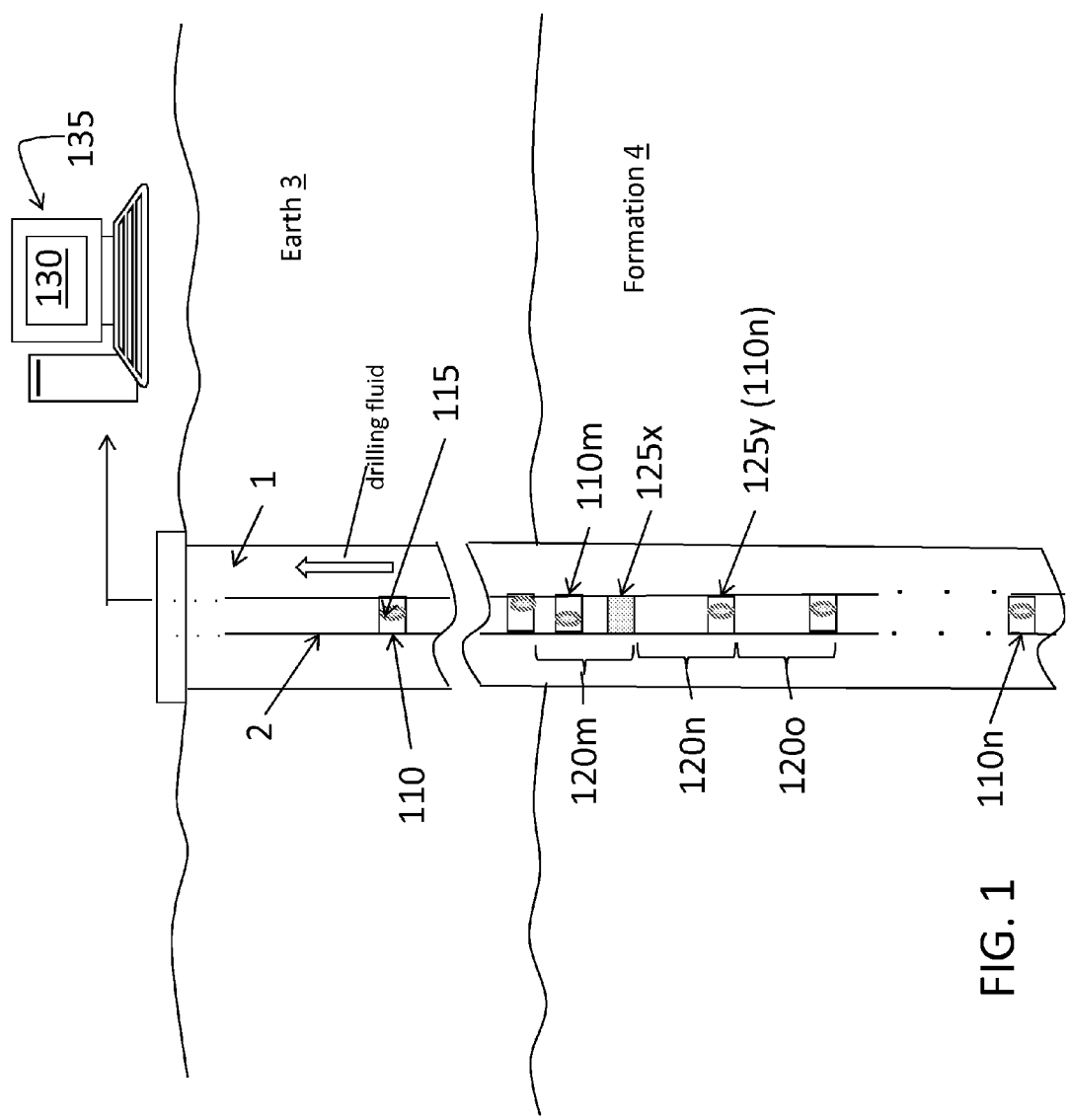
FIG. 1 is a cross-sectional illustration of a borehole including nodes with local clocks according to an embodiment of the invention.

FIG. 1 is a cross-sectional illustration of a borehole 1 including nodes 110 with local clocks 115 according to an embodiment of the invention. Nodes 110 are disposed in the borehole 1 penetrating the earth 3, which may include a formation 4. The formation 4 represents any subsurface material of interest that the nodes 110 may help to characterize. The nodes 110 may be conveyed through the borehole 1 by a carrier 2. The carrier 2 may be a wireline used in wireline logging after drilling has ceased. In this case, the nodes 110 are disposed along the wireline. In alternate embodiments, the carrier 2 may be a drill string used in Logging While Drilling (LWD) with the nodes 110 disposed in a bottomhole assembly. In general, the nodes 110 with local clocks 115 may be part of any system for obtaining downhole measurements in a borehole 1 in which the nodes 110 are distributed along the borehole 1, and in which the nodes 110 transfer data along the borehole 1. That is, a given node 110 may obtain downhole data (act as a sensor measuring data) for transmission to the surface, relay downhole data sent from another node 110 without any additional processing, or may process measured data or data received from another node 110. The data transfer by the nodes 110 may be via signals including, for example, mud pulse, acoustic, electro-magnetic, electrical, or optical.

In the embodiment shown in FIG. 1, the carrier 2 is a wired pipe system composed of multiple wired segments 120 with interspersed couplers 125. These couplers 125 are used to transfer data between sections of tubular elements that make up the carrier 2 (e.g. drill string). The wired segments 120 may, therefore, all be of approximately the same length and, therefore, periodic. The couplers 125 may be nodes 110, though not all couplers 125 may be nodes 110, and. a node may lie between couplers 125 (see e.g., 110$m$). For example, coupler 125$x$ is not a node 110 while coupler 125$y$ is a node 110 that measures or senses some information downhole. Each of the nodes 110 relays information from another node 110 farther from the surface. Each node 110 includes a local clock 115 so that information provided by each node 110 is time-stamped with the local time at which the information was obtained. Information relayed to the surface may be processed by a surface processing system 130 that includes one or more processors and memory devices. The surface processing system 130 also includes or is coupled to the master clock 135.

The local clocks 115 of the nodes 110 may be relatively simple crystal oscillators that are intended to work in an asynchronous manner (i.e., independent of any other timing device in the borehole 1). The local clocks 115 are intended to ensure that inter-sample time periods are accurate to a specified amount, but a local clock 115 at a node 110$m$ may experience time drift with respect to a local clock 115 at another node 110$n$ over the long term. Local clocks 115 are used to time-stamp individual measurements, or records of measurements, with a local time. In general, the master clock 135 may be a very accurate time keeping system, possibly synchronized to a remote timing system, such as that supplied by a Global Positioning System (GPS).

The couplers 125, wired segments 120, and nodes 110 operate in a time-varying thermal environment and are also subject to vibration. As a result, the local clocks 115 of the nodes 110 drift with respect to one another. In addition, signal propagation speeds vary with temperature because, for example, material properties of the wired segments 120 change with temperature. The signal propagation delay includes time delay through the multiple wired segments 120, time delay through the multiple couplers 125, and time delay at each of the nodes 110 encountered by the signal prior to reaching the surface processing system 130. Each of these is discussed in turn.

With regard to the wired segments 120, when these are coaxial segments, then signal propagation velocity is approximately 180 m/μs, assuming a velocity factor of 60% for the dielectric. If each coaxial segment is 10 m in length, then the delay over each segment is 1/18 μs. Over an exemplary borehole 1 of length 10 km, the resulting delay over the combined coaxial segments is 0.056 ms. Because seismic recording rates are 1000 s/s, a clock accuracy (offset accuracy) to 0.5 ms is needed. As illustrated by the exemplary case, this accuracy is apparently achievable by at least a factor of 10, even with this conservative estimate of the coaxial velocity factor. Thus, delays through the wired segments 120 may be ignored, although they may be compensated for if needed. The delay through the wired segments 120 may be modeled to account for temperature effects, for example. With regard to the couplers 125, their cumulative effect may be significant. However, because there are a relatively large number of couplers 125 within a carrier 2 (e.g., wired pipe), the delay introduced by the couplers 125 may be measured experimentally and handled statistically. The surface processing system 130 has knowledge of the number of couplers 125 between itself and a given node 110 and can, therefore, estimate the delay resulting from the couplers 125. If the coupler 125 delay is found to be affected by temperature, then periodic temperature measurements along the carrier 2 may be used to correct the delay values. With regard to the nodes 110, the delay associated with each may be more problematic because nodes 110 are computation points and may read and write messages, as well. As such, the delay at each node 110 is unlikely to be the same from one transmission to the next. Further, the delay at a given node 110 is likely to be different from the delay at another node 110. However, the delay at a node 110 may be made deterministic by delaying a time synchronization signal a specified amount of time at each node 110. That is, as long as the specified amount of time that is assumed as the delay is greater than the actual computation, read/write time taken by any node 110, the actual delay at the node 110 need not be known. For example, if the longest delay at any node 110 is x, a forced delay of x+some margin may be imposed on all the nodes 110 in order to make the delay related to the nodes 110 deterministic. In alternate embodiments, a processing delay (x+some margin) may be imposed on those nodes 110 that process data but not on nodes 110 that merely relay data. In alternate embodiments, the delay at each node 110 may also be determined statistically.

The offset associated with a particular node 110n may then be calculated as:

$$B[n]=C[n]+da[n]+dc[n]+dr[n]-C_M \quad \text{[EQ. 1]}$$

where B[n] is the offset for the nth node 110;
C[n] is the local clock time of the nth node 110;

da[n] is an aggregate of the delay associated with every acquisition platform or node 110 from the surface to the nth node 110;

dc[n] is an aggregate of the delay associated with every wired segment 120 from the surface to the nth node 110;

dr[n] is an aggregate of the delay associated with every coupler 125 from the surface to the nth node 110; and $C_M$ is the master clock 135 time.

As noted above, the delay associated with every node 110 (da[n]) may be an artificial delay that is introduced at each node 110 (or each processing node 110) and ensured to be greater than the actual processing time at every node 110. Also, a node 110 may not be disposed at every coupler 125 but may also be disposed between couplers 125. Thus, the number of couplers 125 between the nth node 110 and the surface may be greater or less than the number of nodes 110 between the nth node 110 and the surface. Once the offset (B[n]) is determined, the timestamp of a data point received from the nth node 110 may be standardized to the time of the master clock 135 as follows:

$$\text{master timestamp=timestamp from nth node}-B[n] \quad \text{[EQ. 2]}$$

Once all the data points from all the nodes 110 are adjusted to have timestamps standardized to the master clock 135 according to EQ. 2, measurements taken at different nodes 110 at the same time may be matched up and used in the analysis of the downhole environment.

In one embodiment, node 110n is the farthest node 110 in the borehole 1 from the surface processing system 130. A time-stamped signal originates at node 110n and is relayed to the surface processing system 130 by each node 110 between node 110n and the surface processing system 130. By having each node 110 add its local timestamp to the relayed signal, the offset associated with each node 110 from the farthest (node 110n) to the closest to the surface processing system 130 may be determined. As such, the node 110n would have generated the synchronization signal. In alternate embodiments, any node 110 may generate the synchronization signal for the surface processing system 130 to determine its offset and the offset of nodes 110 between the node 110 generating the synchronization signal and the surface processing system 130.

Figure 2:
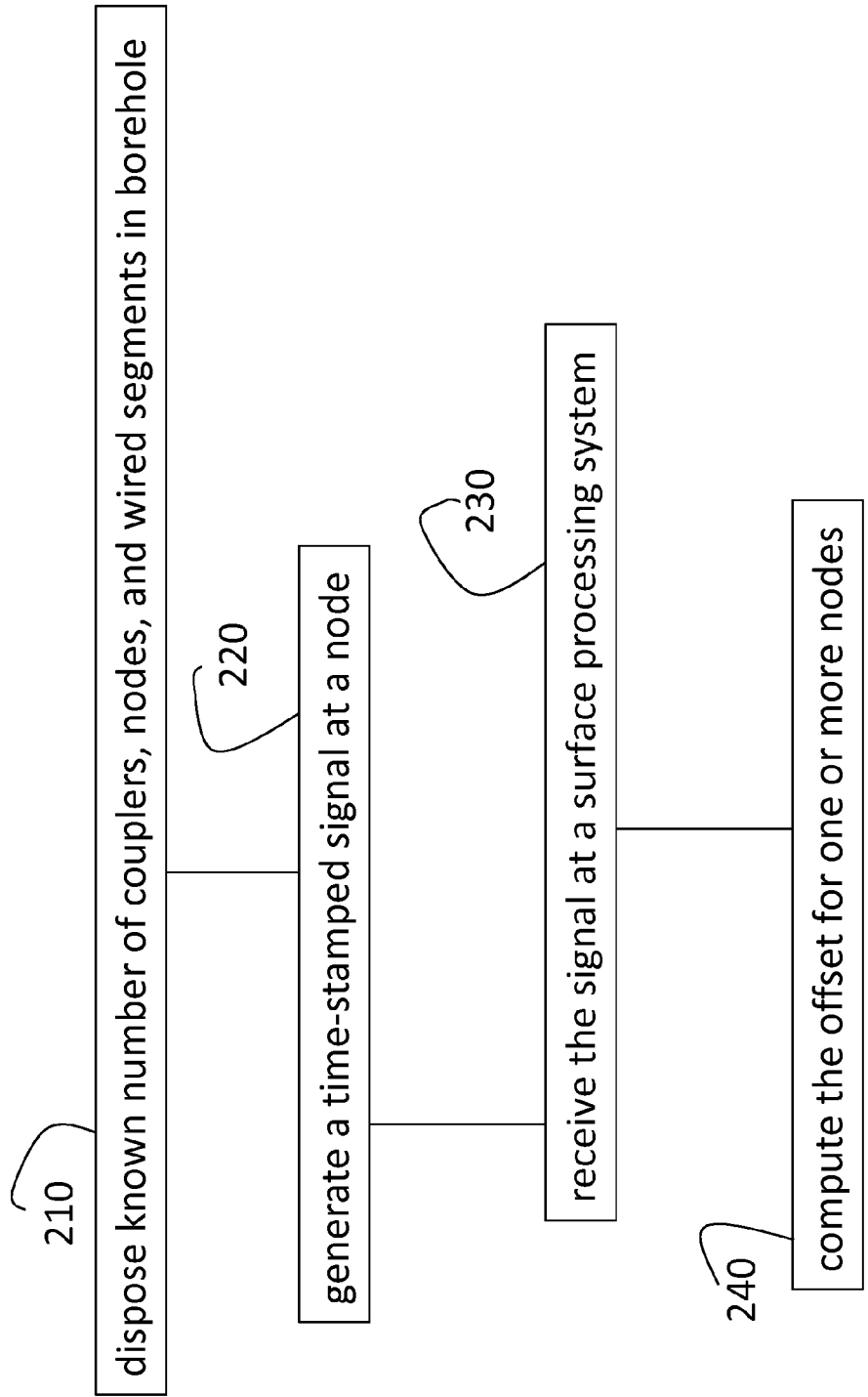
FIG. 2 is a flow diagram of a method of synchronizing distributed measurements in a borehole according to an embodiment of the invention.

FIG. 2 is a flow diagram of a method 200 of synchronizing distributed measurements in a borehole 1 according to an embodiment of the invention. Disposing a known number of couplers 125, nodes 110, and wired segments 120 in the borehole 1 (block 210) may be as shown in FIG. 1, for example. Generating a time-stamped signal at a node 110 (block 220) includes generating the synchronization signal at the node 110n that is farthest from the surface processing system 130. The method 200 also includes receiving the signal at the surface processing system 130 at block 230. Computing the offset at block 240 may be for one or more nodes 110. For example, as discussed above, in one embodiment, a synchronization signal generated at the farthest node 110n is used to determine offsets for every node 110 from the farthest node 110 to the closest node 110 to the surface processing system 130.

While one or more embodiments have been shown and described, modifications and substitutions may be made thereto without departing from the spirit and scope of the invention. Accordingly, it is to be understood that the present invention has been described by way of illustrations and not limitation.

The invention claimed is:
1. A system to synchronize distributed measurements in a borehole, the system comprising:

a plurality of wired segments coupled together by couplers;

a plurality of nodes configured to measure, process, or relay information obtained in the borehole to a surface processing system, each of the plurality of nodes comprising a local clock and being disposed at one of the couplers or between couplers; and the surface processing system coupled to a master clock and configured to determine a time offset between the master clock and the local clock of an nth node among the plurality of nodes based on a downhole generated synchronization signal, wherein the surface processing system determines the time offset associated with the local clock of the nth node based on a subtracting a first value from a second value, the first value including the master clock time and the second value including a sum of components that include the local clock time of the nth node, an aggregate of a delay associated with every node from the surface processing system to the nth node, an aggregate of a delay associated with every wired segment from the surface processing system to the nth node, and an aggregate of a delay associated with every coupler from the surface processing system to the nth node.

2. The system according to claim 1, wherein the surface processing system determines a time offset associated with every node between the nth node and the surface processing system.

3. The system according to claim 1, wherein the wired segments are part of a wired pipe.

4. The system according to claim 1, wherein the surface processing system determines the time offset associated with the local clock of the nth node as follows:

$$B[n]=C[n]+da[n]+dc[n]+dr[n]-C_M$$

where B[n] is the time offset for the nth node;
C[n] is the local clock time of the nth node;
da[n] is the aggregate of the delay associated with every node from the surface processing system to the nth node;
dc[n] is the aggregate of the delay associated with every wired segment from the surface processing system to the nth node;
dr[n] is the aggregate of the delay associated with every coupler from the surface processing system to the nth node; and
$C_M$ is the master clock time.

5. The system according to claim 4, wherein the delay associated with every coupler is based on a statistical analysis of experimental results.

6. The system according to claim 4, wherein the delay associated with every wired segment is the same based on a length of each of the plurality of wired segments.

7. The system according to claim 4, wherein the delay associated with each wired segment is determined based on a model.

8. The system according to claim 4, wherein the delay associated with every node that performs processing is an artificial delay greater than a processing delay at any node.

9. The system according to claim 4, wherein the delay associated with each node is determined statistically.

10. The system according to claim 1, wherein the surface processing system determines a synchronized time stamp from a time stamp associated with data from the nth node based on the time offset associated with the local clock of the nth node from the time stamp.

11. A method of synchronizing distributed measurements in a borehole, the method comprising:

disposing a known number of wired segments coupled together by couplers in the borehole;

disposing nodes along the wired segments, the nodes being disposed at two or more of the couplers or between couplers and each node comprising a local clock and configured to measure or relay information obtained in the borehole to a surface processing system;

generating a time-stamped signal at an nth node based on the local clock of the nth node;

receiving the time-stamped signal at the surface processing system; and the surface processing system computing a time offset between a master clock associated with the surface processing system and the local clock of the nth node, wherein the surface processing system computing the time offset associated with the local clock of the nth node is based on subtracting a first value from a second value, the first value including the master clock time and the second value including a sum of components that include the local clock time of the nth node, an aggregate of a delay associated with every node from the surface processing system to the nth node, an aggregate of a delay associated with every wired segment from the surface processing system to the nth node, and an aggregate of a delay associated with every coupler from the surface processing system to the nth node.

12. The method according to claim 11, further comprising the surface processing system computing a time offset between the master clock and the local clock of every node between the nth node and the surface processing system.

13. The method according to claim 11, wherein the surface processing system computing the time offset for the nth node is as follows:

$$B[n]=C[n]+da[n]+dc[n]+dr[n]-C_M$$

where B[n] is the time offset for the nth node;
C[n] is the local clock time of the nth node;
da[n] is the aggregate of the delay associated with every node from the surface processing system to the nth node;
dc[n] is the aggregate of the delay associated with every wired segment from the surface processing system to the nth node;
dr[n] is the aggregate of the delay associated with every coupler from the surface processing system to the nth node; and
$C_M$ is the master clock time.

14. The method according to claim 13, wherein the delay associated with every coupler is based on a statistical analysis of experimental results.

15. The method according to claim 13, wherein the delay associated with every wired segment is the same based on a length of each of the wired segments.

16. The method according to claim 13, wherein the delay associated with each wired segment is determined based on a model.

17. The method according to claim 13, wherein the delay associated with every node that performs processing is an artificial delay greater than a processing delay at any node.

18. The method according to claim 13, wherein the delay associated with each node is determined statistically.

19. The method according to claim 11, further comprising the surface processing system determining a standardized time stamp from the time stamp associated with data from the nth node based on the time offset associated with the local clock of the nth node from the time stamp.

* * * * *